(12) United States Patent
Siomina et al.

(10) Patent No.: US 9,107,084 B2
(45) Date of Patent: Aug. 11, 2015

(54) MEASUREMENT AND REPORTING CONFIGURATION IN RADIO COMMUNICATION NETWORKS

(75) Inventors: Iana Siomina, Solna (SE); Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 94 days.

(21) Appl. No.: 13/637,844

(22) PCT Filed: Jul. 6, 2012

(86) PCT No.: PCT/SE2012/050798
§ 371 (c)(1),
(2), (4) Date: Sep. 27, 2012

(87) PCT Pub. No.: WO2013/028119
PCT Pub. Date: Feb. 28, 2013

(65) Prior Publication Data
US 2013/0235738 A1    Sep. 12, 2013

Related U.S. Application Data

(60) Provisional application No. 61/526,145, filed on Aug. 22, 2011.

(51) Int. Cl.
H04W 24/00    (2009.01)
H04W 72/12    (2009.01)

(52) U.S. Cl.
CPC .......... *H04W 24/00* (2013.01); *H04W 72/1263* (2013.01); *H04W 72/1257* (2013.01); *H04W 72/1289* (2013.01)

(58) Field of Classification Search
CPC ... H04W 72/08; H04W 24/10; H04W 84/045; H04W 72/04; H04W 36/0083; H04W 84/047; H04W 28/18; H04W 28/048; H04W 52/244
USPC .................. 370/252, 241, 465, 336, 437, 329
See application file for complete search history.

(56) References Cited

U.S. PATENT DOCUMENTS

2012/0082052 A1*    4/2012    Oteri et al. ..................... 370/252
2012/0115527 A1*    5/2012    Narasimha et al. ........... 455/513

(Continued)

OTHER PUBLICATIONS

International Search Report issued in corresponding International application No. PCT/SE2012/050798, mailing date Oct. 31, 2012.

(Continued)

*Primary Examiner* — Jamal Javaid
*Assistant Examiner* — Will Lin
(74) *Attorney, Agent, or Firm* — Patent Portfolio Builders PLLC

(57) ABSTRACT

A wireless device, a network apparatus, a test equipment and a method in a heterogeneous radio-communication system configured to perform and report measurements in view of patterns including at least two types of subframes are provided. The wireless device has a transceiver and a processing unit. The transceiver is configured to send and to receive signals from more than one cell, and to receive information defining a first pattern related to first cells. The processing unit is configured to determine a second pattern related to second cells based on the first pattern and at least one of an indication or predefined rule relating the first pattern and the second pattern, to perform measurements related to the signals, and to report, to a network node, measurement results based on the measurements, the measurement results being related to signals received from a number of one or more cells.

26 Claims, 6 Drawing Sheets

(56) References Cited

U.S. PATENT DOCUMENTS

2013/0189972 A1* 7/2013 Martin et al. .............. 455/423
2013/0279343 A1* 10/2013 Jeong et al. ................ 370/241

OTHER PUBLICATIONS

Written Opinion of the International Searching Authority issued in corresponding International application No. PCT/SE2012/050798, mailing date Oct. 31, 2012.

LG Electronics, "Consideration on the Pico Cell List for eICIC RRM Measurements," 3rd Generation Partnership Project (3GPP) Draft, R4-114170, Mobile Competence Centre, 650, Route des Lucioles, F-06921 Sophia-Antipolis Cedex, France, 3GPP TSG-RAN WG4 Meeting #60, Athens, Greece, Aug. 22-26, 2011, XP050543297.

Ericsson et al., "On Measurement Restrictions Patterns in TDM ICIC", 3rd Generation Partnership Project (3GPP), Draft, R2-110121, Mobile Competence Centre, 650, Route des Lucioles, F-06921 Sophia-Antipolis Cedex, France, 3GPP TSG-RAN WG2 Meeting #72 bis, Dublin, Ireland, Jan. 17-21, 2011, XP050474625.

Itri, "Further Considerations on RRM Measurement Pattern2 Designs," 3rd Generation Partnership Project (3GPP), Draft, R2-110397, Mobile Competence Centre, 650, Route des Lucioles, F-06921 Sophia-Antipolis Cedex, France, 3GPP TSG-RAN WG2 Meeting #72 bis, Dublin, Ireland, Jan. 17-21, 2011, XP050493028.

Alcatel-Lucent, "Neighbor Cells List for Restricted Patters," 3rd Generation Partnership Project (3GPP), 3GPP Draft, R4-114060, Mobile Competence Centre, 650, Route des Lucioles, F-06921 Sophia-Antipolis Cedex, France, 3GPP TSG-RAN WG4 Meeting #60, Athens, Greece, Aug. 22-26, 2011, XP050543236.

Ericsson et al., "On Blank MBSFN Subframes for eICIC," 3rd Generation Partnership Project (3GPP), 3GPP Draft, R4-113830, Mobile Competence Centre, 650, Route des Lucioles, F-06921 Sophia-Antipolis Cedex, France, 3GPP TSG-RAN WG4 Meeting #59AH, Bucharest, Romania, Jun. 27-Jul. 1, 2011, XP050542982.

Ericsson et al., "On ABS Patterns with eICIC," 3rd Generation Partnership Project (3GPP), 3GPP Draft, R4-112670, Mobile Competence Centre, 650, Route des Lucioles, F-06921 Sophia-Antipolis Cedex, France, 3GPP TSG-RAN WG4 Meeting #59, Barcelona, Spain, May 9-13, 2011, XP050502693.

Ericsson et al., "On Blank MBSFN Issues," 3rd Generation Partnership Project (3GPP), 3GPP Draft, R4-114420, Mobile Competence Centre, 650, Route des Lucioles, F-06921 Sophia-Antipolis Cedex, France, 3GPP TSG-RAN WG4 Meeting #60, Athens, Greece, Aug. 22-27, 2011, XP050543484

Ericsson et al., "Remaining Issues on RRM Requirements," 3rd Generation Partnership Project (3GPP), 3GPP Draft, R4-113614, Mobile Competence Centre, 650, Route des Lucioles, F-06921 Sophia-Antipolis Cedex, France, 3GPP TSG-RAN WG4 Meeting #59AH, Bucharest, Romania, Jun. 27-Jul. 1, 2011, XP050542768.

Samsung, "Inter-Frequency eICIC Enhancements for Rel 11.0," 3rd Generation Partnership Project (3GPP), 3GPP Draft, R4-114036, Mobile Competence Centre, 650, Route des Lucioles, F-06921 Sophia-Antipolis Cedex, France, 3GPP TSG-RAN2 #75 Meeting, Athens, Greece, Aug. 22-26, 2011, XP050539518.

Samsung, "Clarification regarding eICICI measurements," 36331_CR0662R3_(REL-10)_R2-113540, 3rd Generation Partnership Project (3GPP), Mobile Competence Centre, 650, Route des Lucioles, F-06921 Sophia-Antipolis Cedex, France, 3GPP TSG-RAN2 Meeting #74, Barcelona, Spain, May 9-13, 2011, XP050538946.

* cited by examiner

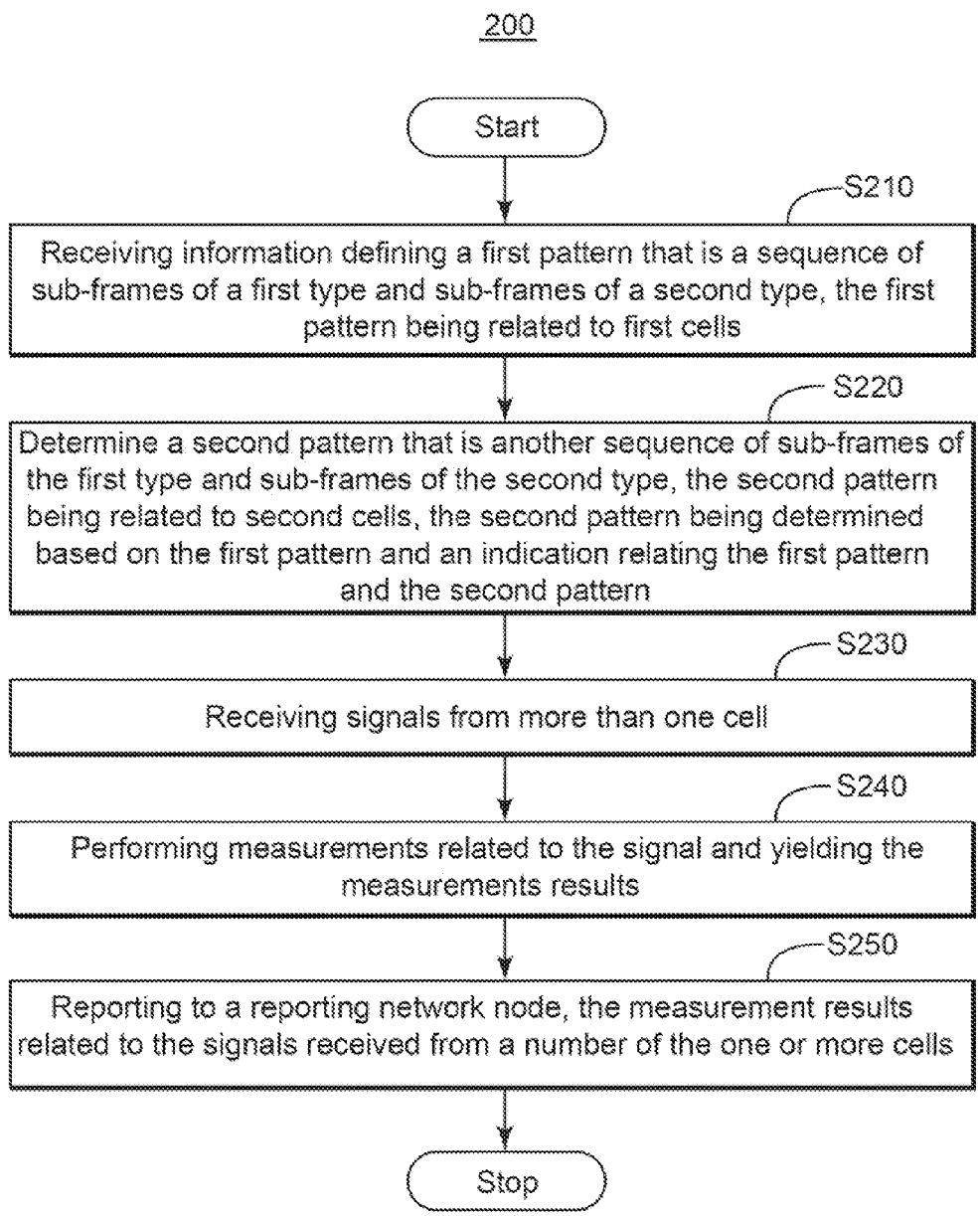

MEASUREMENT AND REPORTING CONFIGURATION IN RADIO COMMUNICATION NETWORKS

RELATED APPLICATION

The present application is related to, and claims priority from, U.S. Provisional Patent Application No. 61/526,145, filed on Aug. 22, 2011, entitled "Measurement and Reporting Configuration Under Partial Neighbor Cell Lists in Heterogeneous Networks", to Iana Siomina and Muhammad Kazmi, the disclosure of which is incorporated here by reference.

TECHNICAL FIELD

The present invention relates generally to measurement and reporting in radio communication networks, and in particular, to methods, systems, devices and software for configuring, performing and reporting measurements in view of patterns including at least two types of subframes.

BACKGROUND

Radio communication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radio communication applications, while at the same time using legacy infrastructure, network operators could deploy hybrid networks wherein a next generation radio communication system is overlaid onto an existing circuit-switched or packet-switched network as a first step in the transition to an all IP-based network. Alternatively, a radio communication system can evolve from one generation to the next while still providing backward compatibility for legacy equipment.

One example of such an evolved network is based upon the Universal Mobile Telephone System (UMTS) which is an existing third generation (3G) radio communication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

LTE uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}=1$ ms as shown in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Downlink transmissions are dynamically scheduled, i.e., in each subframe the base station (typically referred to as an eNodeB in LTE) transmits control information indicating to which terminals and on which resource blocks the data is transmitted during the current downlink subframe. This control signalling is typically transmitted in the first 1, 2, 3 or 4 OFDM symbols in each subframe. A downlink system with 3 OFDM symbols as the control region is illustrated in FIG. 3.

The interest in deploying low-power nodes (such as pico base stations, home eNodeBs, relays, remote radio heads, etc.) for enhancing the macro network performance in terms of the network coverage, capacity and service experience of individual users has been constantly increasing over the last few years. At the same time, there has been realized a need for enhanced interference management techniques to address the arising interference issues caused, for example, by a significant transmit power variation among different cells and cell association techniques developed earlier for more uniform networks.

In 3GPP, heterogeneous network networks have been defined as networks where low-power (e.g., pico) nodes of different transmit powers are placed throughout a macro-cell layout, implying also non-uniform traffic distribution. Such networks are, for example, effective for capacity extension in certain areas, so-called traffic hotspots, i.e. small geographical areas with a higher user density and/or higher traffic intensity where installation of pico nodes can be considered to enhance performance. Heterogeneous networks may also be viewed as a way of increasing the density of networks to adapt for the traffic needs and the environment. However, heterogeneous networks bring also challenges for which the network has to be prepared to ensure efficient network operation and superior user experience. Some challenges are related to the increased interference in the attempt to increase small cells associated with low-power nodes (i.e., cell range expansion) and other challenges are related to potentially high interference in uplink due to a mix of large and small cells.

According to 3GPP, heterogeneous networks comprise networks where low power nodes are placed throughout a macro-cell layout. The interference characteristics in a heterogeneous network can be significantly different than in a homogeneous network, in downlink or uplink or both.

FIG. 4 illustrates a few situations that may occur in a heterogeneous network. In FIG. 4, user equipments (UEs), which are located within a macro-cell 10 may be served by a high power base station 12. UEs within cells 15a, 15b, 15c and 15d may be served by low power (e.g., pico) base stations 17a, 17b, 17c, and 17d, respectively. The cells 15a, 15b, 15c, and 15d are smaller than the macro-cell 10 and overlap, at least partially, the macro-cell 10.

A UE 18a, which is located both in cell 10 and in cell 15a and is served by the base station 12, suffers interference from the base station 17a. A UE 18b, which is located in an area where the cell 15b overlaps the macro-cell 10 and is served by the base station 12, can cause severe interference towards base station 17b. A UE 18c, which is located an area where the cell 15c overlaps the macro-cell 10 and is served by the base station 17c, suffers interference from base station 17b. A UE 18d, which is located an area where the cell 15d overlaps the macro-cell 10 and is served by the base station 17d, suffers interference from the base station 12.

Another challenging interference scenario occurs with so-called cell range expansion, when the traditional downlink cell assignment rule diverges from the RSRP (i.e., Reference Signal Reference Power) based approach, e.g. towards a path-loss-based approach or a pathgain-based approach adopted for cells with a transmit power lower than neighbor cells. The cell range expansion is illustrated in FIG. 5. A high power (macro) base station 20 is capable of serving UEs within a cell having a radius 21 (i.e., the small-dashed line), and a low power (pico) base station 22 is conventionally capable of serving UEs within a cell having a radius 23 (i.e., the large-dashed line). When the cell range of the cell served by the base station 22 is expanded according to a Δ parameter, a wireless device 25 may potentially be within the range served by the base station 22 and it may be served by the base station 22 instead of being served by the base station 20 when cell selection/reselection occurs. The cell range expansion, indicated by the Δ parameter between points A and B in FIG. 5, is limited by the DL (downlink) performance since UL (uplink) performance typically improves when the cell sizes of neighbor cells become more balanced.

In wireless networks, maintaining a good signal quality is a requirement in order to ensure reliable and high-bitrate transmissions as well as robust control channel performance. The signal quality is determined by the received signal strength and its relation to the total interference and noise received by the receiver. A good network plan which, among other things, includes cell planning, is a prerequisite for successful network operation, but it is static. For more efficient radio resource utilization, such a network plan has to be complemented at least by semi-static and dynamic radio resource management mechanisms, which are also intended to facilitate interference management, and by deploying more advanced antenna technologies and algorithms.

One way to handle interference is, for example, to adopt more advanced transceiver technologies, e.g., by implementing interference suppression or interference cancellation mechanisms in receivers. Another way, which may or may not be complementary to the former, is to design efficient interference coordination algorithms and transmission schemes in the network. The coordination may be realized in a static, a semi-static or a dynamic fashion. The static or semi-static schemes may rely on reserving time-frequency resources (e.g., a part of the bandwidth and/or time instances) that are orthogonal for strongly interfering transmissions. Such interference coordination may be implemented for all channels or for specific channels (e.g., data channels or control channels) or signals. A dynamic coordination may be implemented, e.g., by scheduling.

Enhanced inter-cell interference coordination (eICIC) mechanisms have been developed specifically for heterogeneous networks. Some of these (now standardized) mechanisms are designed to ensure that the UE performs at least some measurements, such as, measurements for radio resource management (RRM), measurements for radio link monitoring (RLM), and measurements for channel state information (CSI), in low-interference subframes. These mechanisms involve configuring patterns of low-interference subframes at transmitting nodes and configuring measurement patterns for UEs.

Two types of patterns have been defined for eICIC to enable restricted measurements in DL (downlink): restricted measurement patterns, which are configured by a network node and signaled to the UE, and transmission patterns, also known as Almost Blank Subframe (ABS) patterns, which are configured by a network node, describe the transmission activity of a radio node, and may be exchanged between the radio nodes.

To enable restricted measurements for RRM, RLM, CSI as well as for demodulation, the UE may receive (via Radio Resource Controller) UE-specific signaling the following set of patterns (as described in TS 36.331 v10.1):

Pattern 1: A single RRM/RLM measurement resource restriction for the serving cell;

Pattern 2: One RRM measurement resource restriction for neighbor cells (up to 32 cells) per frequency (currently only for the serving frequency);

Pattern 3: Resource restriction for CSI measurement of the serving cell with 2 subframe subsets configured per UE. A pattern is a bit string indicating restricted and unrestricted subframes (i.e., subframes of a first type and subframes of a second type) characterized by a length and a periodicity, which are different for FDD (frequency-division duplex) and TDD (time-division duplex), e.g., 40 subframes for FDD and 20, 60 or 70 subframes for TDD. Restricted measurement subframes are configured to allow the UE to perform measurements in subframes with improved interference conditions, which may be implemented by configuring Almost Blank Subframe (ABS) patterns at eNodeBs. The current TS 36.331 v10.1 defines only intra-frequency restricted measurement patterns (also known as measurement resource restriction patterns), although similar patterns may also be defined for UE inter-frequency measurements, such as, inter-frequency cell search, reference signal received power (RSRP), reference signal received quality (RSRQ), positioning measurements, etc. Thus, the measurement pattern can be configured for measuring inter-frequency cells on each frequency carrier. Similarly the measurement patterns can also be used for performing inter-RAT E-UTRAN measurements. In this case, the cell on the serving RAT (e.g. UTRAN, GERAN, CDMA2000, HRPD etc) will configure the pattern enabling UE to perform inter-RAT E-UTRAN measurements (e.g., inter-RAT E-UTRAN cell search, RSRP, RSRQ, positioning measurements, etc.).

The restricted measurement patterns are provided to the UE via dedicated signaling and thus apply only for UEs in CONNECTED mode. For UEs in IDLE mode, similar patterns may be provided via broadcast signaling.

An ABS pattern indicates subframes when the eNodeB restricts its transmissions (e.g., does not schedule or transmits at a lower power). The subframes with restricted transmissions are referred to as ABS subframes. Currently, eNodeBs can suppress data transmissions in ABS subframes but the ABS subframes cannot be fully blank—at least some of the control channels and physical signals are still transmitted. Examples of control channels that are transmitted in ABS subframes even when no data is transmitted are PBCH (Physical Broadcast Channel) and PHICH (Physical Harq Indicator Channel). Examples of physical signals that have to be transmitted, regardless of whether the subframes are ABS or not, are cell-specific reference signals (CRS) and synchronization signals (PSS and SSS). Positioning reference signals (PRS) may also be transmitted in ABS subframes.

If an MBSFN (Multi-Media Broadcast over a Single Frequency Network) subframe coincides with an ABS, the subframe is also considered as ABS. CRS are not transmitted in MBSFN subframes, except for the first symbol, which allows for avoiding CRS interference from an aggressor cell to the data region of a measured cell.

ABS patterns may be exchanged between eNodeBs, e.g., via X2 interface, but information about these patterns is currently not transmitted to the UE, although it is possible as described in the PCT application, I. Siomina and M. Kazmi, International application PCT/SE2011/050831, filed on Jun. 23, 2011. In this PCT application, also multi-level patterns have been described where the "level" may be associated with a decision comprising a setting of one or more parameters, the setting characterizing a low-transmission activity, and the parameters being e.g. of any of transmit power, bandwidth, frequency, subset of subcarriers, etc. Such patterns may be associated with either overall transmissions from the node or particular signal(s) (e.g. positioning reference signals, or PRS) or channel(s) (e.g. data channels and/or control channels).

Regarding neighbor cell information, neighbor cell lists (NCLs) are currently specified e.g. for mobility purpose. Transmitting neighbor cell lists from the E-UTRA radio network to the UE is now a standardized feature set forth in 3GPP TS 36.331, Evolved Universal Terrestrial Radio Access (E-UTRA), Radio Resource Control (RRC), Protocol specification, v10.1.0. Transmitting neighbor cell lists is optional in LTE because the UE is required to meet the measurement requirements (e.g. cell search, RSRP and RSRQ accuracy) without receiving an explicit neighbor cell list from the eNodeB. A similar functionally (i.e. signaling of NCL) has been mandatory in E-UTRA since the UE is required to meet more stringent measurement requirements (e.g. cell search, CPICH RSCP and CPICH Ec/No accuracy) only when an explicit neighbor cell list is signaled by the radio network controller (RNC).

The neighbor cell information in E-UTRA may be signaled over RRC either on the Broadcast Control Channel (BCCH) logical channel in a system information block or on the Dedicated Control Channel (DCCH) in an RRC measurement configuration/reconfiguration message.

The neighbor cell related information relevant only for intra-frequency cell re-selection is signaled in the Information Element (IE) SystemInformationBlockType4, whilst IE SystemInformationBlockType5 is used for inter-frequency cell re-selection.

Both system information blocks (SIBs) are signaled over RRC dedicated signaling in the System Information (SI) message through the BCCH logical channel using RLC transparent-mode service. This SI system information and thus the neighbor cell information may be acquired both in RRC_IDLE and RRC-CONNECTED states.

Mapping of SIBs to SI messages is flexibly configurable by scheduling InfoList with restrictions that each SIB is contained only in a single SI message and only SIBs having the same scheduling requirement (periodicity) can be mapped to the same SI message. The transmit periodicity of SIB4 and SIB5 can be configured as one of: 8, 16, 32, 64, 128, 256 and 512 radio frames.

Considering now the contents of the cell information signaled to assist UE mobility in an intra-frequency context, the neighbor cell related information relevant only for intra-frequency cell re-selection is transmitted in the IE SystemInformationBlockType4 and includes cells with specific re-selection parameters as well as blacklisted cells. The maximum number of cells in intra-frequency NCLs or black cell list (BCL) is 16 cells. An NCL contains the Physical Cell Identities (PCIs) and the corresponding cell offset. The offset is used to indicate a cell- or frequency-specific offset to be applied when evaluating candidates for cell re-selection or when evaluating triggering conditions for measurement reporting, and is currently in the range of [−24 dB, 24 dB]. A BCL contains a range of physical cell identities, including the starting (lowest) cell identity in the range and the number of identities in the range. The Physical Cell Identity range is specified in the above mentioned standards document as follows:

|      | PhysCellIdRange ::=                          | SEQUENCE {              |
|------|----------------------------------------------|-------------------------|
|      | start                                        | PhysCellId,             |
|      | range                                        | ENUMERATED {            |
| i.   | n4, n8, n12, n16, n24, n32, n48, n64, n84,   |                         |
| ii.  | n96, n128, n168, n252, n504, spare2,         |                         |
| iii. | spare1}                                      | OPTIONAL  -- Need OP    |

Considering now the contents of the cell information signaled to assist UE mobility in an inter-frequency context, the neighbor cell related information relevant only for inter-frequency cell re-selection is signaled in the IE SystemInformationBlockType5. The IE includes cell re-selection parameters common for a frequency as well as cell specific re-selection parameters. With the current specification, the parameters that are signalled per carrier frequency and optionally per cell include:

carrier frequency (or ARFCN),
an indicator for the presence of antenna port 1,
allowed measured bandwidth,
reselection parameters accounting for RSRP and
neighbor cell configuration—a bit string of two bits, used to provide the information related to MBSFN and TDD UL/DL configuration of neighbor cells.

The reselection of parameters includes:
selection of an indicator for the required minimum received RSRP in the E-UTRAN cell, in the range of [−140 dBm, −44 dBm],
reselection timer value for E-UTRA indicating the time during which the cell has to be evaluated and ranked, and
reselection thresholds for RSRP when reselecting toward a higher and a lower priority.

The two bit string of the neighbor cell configuration is:
00: not all neighbor cells have the same MBSFN subframe allocation as serving cell,
10: the MBSFN subframe allocations of all neighbor cells are identical to or subsets of that in the serving cell,
01: no MBSFN subframes are present in all neighbor cells, and
11: different UL/DL allocation in neighboring cells for TDD compared to the serving cell.

For TDD, 00, 10 and 01 are only used for same UL/DL allocation in neighboring cells compared to the serving cell.

The optional parameters that may be transmitted with the current specification for inter-frequency NCL, per carrier frequency or per cell, include:
Offset (0 dB default),
the maximum UE transmit power (if absent the UE applies the maximum power according to the UE capability),
speed-dependent scaling factor for the E-UTRA reselection timer value,
the absolute cell reselection priority of the concerned carrier frequency/set of frequencies,
reselection thresholds for RSRP when reselecting towards a higher and a lower priority, and
inter-frequency BCL.

The maximum number of EUTRA carrier frequencies for inter-frequency NCL is 8. The maximum number of cells in inter-frequency NCLs or black cell list (BCL) is 16 cells.

Considering now the requirements applicability for neighbor cell lists signaled in E-UTRA for mobility purpose, as specified in 3GPP TS 36.331, no UE requirements related to the contents of SystemInformationBlock4 or SystemInformationBlock5, which carry intra- and inter-frequency NCI respectively, apply other than those specified elsewhere e.g. within procedures using the concerned system information, and/or within the corresponding field descriptions. This means in E-UTRA the UE is required to meet the measurement requirements without having the NCL. But on the other hand if the NCL is signaled the UE is still required to meet the current measurement requirements since the UE may ignore the NCL or complement it with the blind cell search.

The UE regulatory identifies new cells and maintains a list of certain minimum number of cells for RSRP/RSRQ measurements (e.g. periodic measurements, event-triggered etc). According to 3GPP TS 36.133, with or without blind search as explained above, the UE has to perform measurements for at least a certain minimum number of identified cells. In the RRC_CONNECTED state the measurement period for intra frequency measurements is 200 ms. When no measurement gaps are activated, the UE shall be capable of performing RSRP and RSRQ measurements for 8 identified-intra-frequency cells, and the UE physical layer shall be capable of reporting measurements to higher layers with the measurement period of 200 ms. When measurement gaps are activated the UE shall be capable of performing measurements for at least $Y_{measurement\ intra}$ cells, where $Y_{measurement\ intra}$ is defined in the following equation. If the UE has identified more than $Y_{measurement\ intra}$ cells, the UE shall perform measurements of at least 8 identified intra-frequency cells but the reporting rate of RSRP and RSRQ measurements of cells from UE physical layer to higher layers may be decreased. For FDD:

$$Y_{measurement\ intra} = \text{Floor}\left\{ X_{basic\ measurement\ FDD} \cdot \frac{T_{Intra}}{T_{Measurement\_Period, Intra}} \right\},$$

where $X_{basic\ measurement\ FDD}=8$ (cells), $T_{Measurement\_Period,\ Intra}=200$ ms is the measurement period for Intra frequency RSRP measurements, $T_{Intra}$ is the time that is available for intra frequency measurements, during the measurement period with an arbitrarily chosen timing. Time is assumed to be available for performing intra frequency measurements whenever the receiver is guaranteed to be active on the intra frequency carrier. For example, when gap pattern #0 is configured and no DRX (Discontinuous Reception) is used or when DRX 40 ms then $T_{Intra}=170$ ms per 200 ms L1 period because 5 gaps of 6 ms will occur over 200 ms L1 period.

Considering next the signaling of neighbor cell lists to support interference coordination, together with a restricted measurement pattern for neighbor-cell measurements, a list of cells of up to maxCellMeas (32) may optionally be provided. If such a list is provided, then it is interpreted as the list of cells for which the restricted measurement pattern is applied. If the list is not provided, then the UE applies time domain measurement resource restriction for all neighbor cells.

Regarding the requirements applicability for neighbor cell lists signaled in E-UTRA for interference coordination, in the current standard, the same requirements as described above for requirements associated with mobility apply. It has been discussed to mandate signaling the neighbor cell list whenever a restricted measurement pattern is signaled. For cells not in the eICIC list, Rel8/9 mechanisms are claimed to be sufficient. It has been considered that:

a UE is only required to measure and report two restricted cells if the restricted measurement pattern for neighbor cells is configured, and when a UE is configured for restricted measurements, the UE processing capability of 8 intra-frequency is only required if the cell list is configured together with restricted measurement pattern for neighbor cells.

In the currently standardized environment, numerous problems associated with handling neighbour cell lists, measurements and measurement patterns remain.

One problem is that the UE's behaviour and measurement requirements are ambiguous when cell lists are configured for restricted measurements. For example, when the list is provided together with the pattern configuration, the measurements shall be performed in the restricted subframes, but it is unclear whether the minimum 8 reported cells may also apply exclusively to restricted subframes.

Another problem is that for cells that are not in the list, it is unclear in which subframes the reported measurements have been performed.

In the solutions mandating neighbor cell lists, it is problematic that UE is still required to measure and report on minimum 8 cells in restricted subframes. In this case as above, for cells not in the list, it is unclear in which subframes the reported measurements have been performed.

In other solutions, it is problematic first that the UE may report measurements only for very limited number of cells (e.g. for 2 which is less than the minimum requirements of 8 cells). Secondly if few cells are included in the list, the UE may not report measurements from the remaining cells, thereby degrading the system performance.

Another problem is that there are no measurement requirements for the IDLE state, although the restricted measurement pattern may also be standardized for the IDLE state in the future.

In this document the following abbreviations are used:
3GPP 3$^{rd}$ Generation Partnership Project
BS Base Station
CRS Cell-specific Reference Signal
eICIC enhanced ICIC
eNodeB evolved Node B
E-SMLC Evolved SMLC
ICIC Inter-Cell Interference Coordination
LTE Long-Term Evolution
PCI Physical Cell Identity
RAT Radio Access Technology
RRC Radio Resource Control
SFN System Frame Number
SINR Signal-to-Interference Ratio
UE User Equipment
UMTS Universal Mobile Telecommunications System

SUMMARY

Some embodiments described hereinafter implement measurement rules applicable when restricted measurement patterns are configured, to ensure UE meets all necessary requirements. Some embodiments implement pattern configuration rules when restricted measurement patterns or transmit patterns are configured, especially on multiple carriers. Some embodiments are configured to perform and report comparative measurements. Some embodiments are related to configuring restricted measurement for UE in the IDLE state or any other low-activity state (e.g., dormant state).

According to an exemplary embodiment, there is a wireless device including a transceiver. The transceiver is configured at least to receive radio signals on at least a first carrier frequency. The transceiver is further configured to receive information regarding a first pattern associated with the first carrier frequency, the first pattern being a sequence of subframes of a first type and subframes of a second type. The wireless device also includes a processor configured to determine a second pattern. The processor determines the second pattern based on the first pattern and at least one of an indication and a pre-determined rule, which indication or pre-determined rule relates the first pattern to the second pattern, wherein the first pattern and the second pattern are at least one of a measurement pattern and a transmit pattern. A transmit pattern may interchangeably be referred to as a signal transmit pattern or a signal transmission pattern. A signal may be a physical signal or a physical channel or a combination thereof and can be transmitted over one or more time-frequency resources.

According to another embodiment, a method is performed by a wireless device for processing radio signals associated with wireless communications. The method includes receiving radio signals on at least a first carrier frequency. The radio signals include information regarding a first pattern associated with the first carrier frequency. The first pattern is a sequence of subframes of a first type and subframes of a second type. The method further includes determining a second pattern. The second pattern is determined based on the first pattern and at least one of: an indication and a pre-determined rule, which indication or pre-determined rule relates the first pattern to the second pattern. The first pattern and the second pattern are at least one of a measurement pattern and a transmit pattern.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 10 is a flow diagram of a method performed in a wireless device according to another exemplary embodiment.

DETAILED DESCRIPTION

The following detailed description of the example embodiments refers to the accompanying drawings. The same reference numbers in different drawings identify the same or similar elements. Also, the following detailed description does not limit the invention. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

In order to address the above-identified problems related to the current manner of performing and reporting measurements in radio communication systems, some of the exemplary embodiments described below provide:

measurement rules when restricted measurement patterns are configured to ensure UE meets all necessary requirements, pattern configuration rules when restricted measurement patterns or transmit patterns are configured, especially on multiple carriers, comparative measurements, and methods for configuring restricted measurement for the UE in the IDLE state or any other low-activity state.

The terms "base station" and "user equipment (UE)" are used herein as generic terms. As will be appreciated by those skilled in the art, in the LTE architecture an evolved NodeB (eNodeB) may correspond to the base station, i.e., a base station is a possible implementation of the eNodeB. However, the term "eNodeB" is also broader in some senses than the conventional base station since the eNodeB refers, in general, to a logical node. The term "base station" is used herein as inclusive of a base station, a NodeB, an eNodeB or other nodes specific for other architectures. The term "user equipment" is used in the description is inclusive of any wireless device in a radio-communication system.

Figure 1:
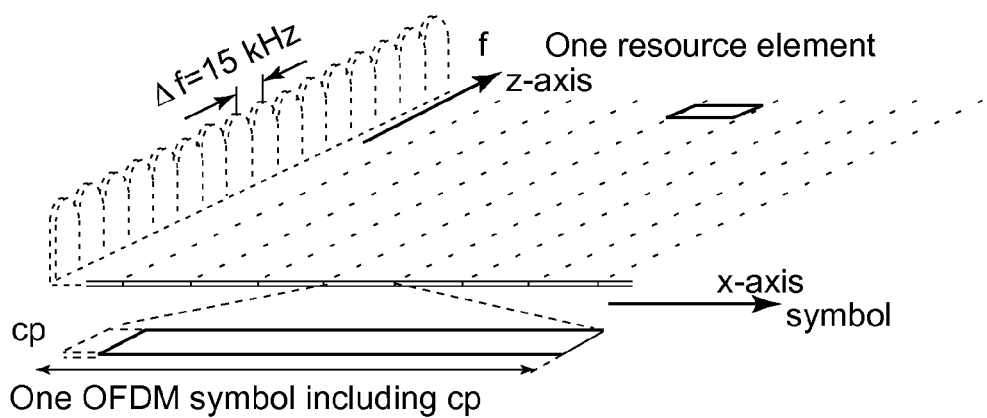
FIG. 1 is a schematic diagram illustrating the LTE time-frequency grid.
Figure 2:
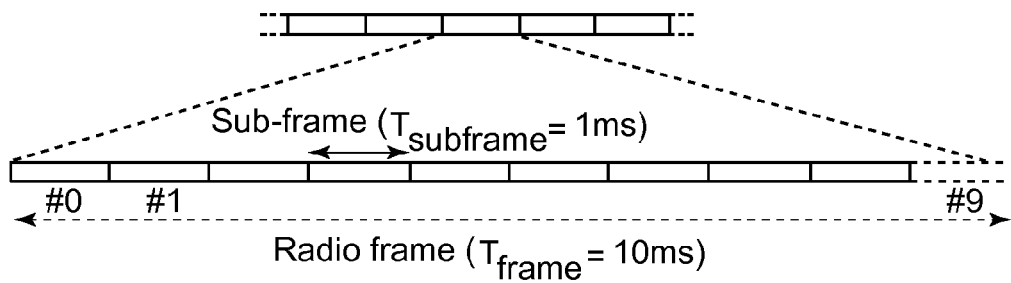
FIG. 2 is a schematic diagram illustrating the LTE frame structure.
Figure 3:
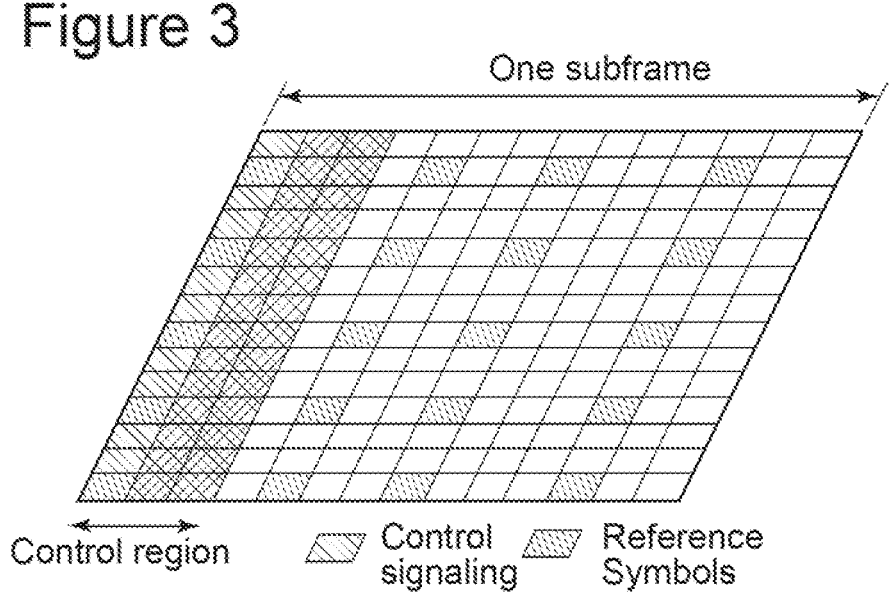
FIG. 3 is a schematic diagram illustrating an LTE subframe.
Figure 4:
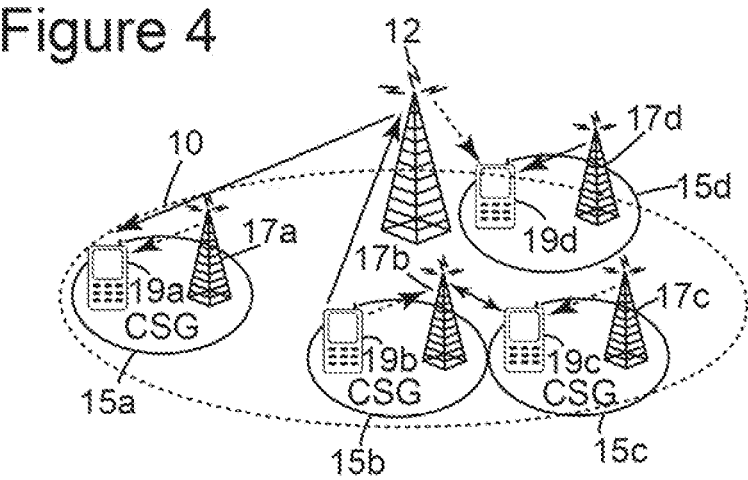
FIG. 4 depicts various interference scenarios in heterogeneous networks.
Figure 5:
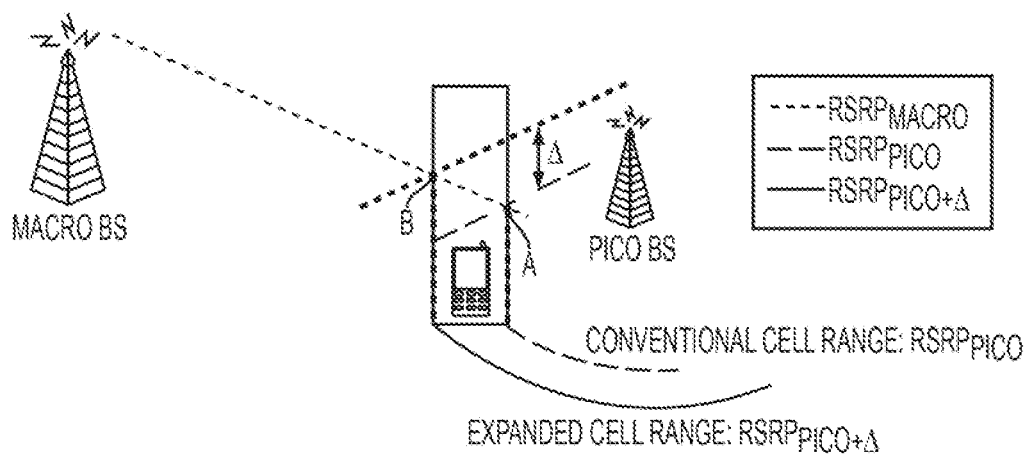
FIG. 5 is a schematic diagram illustrating cell range expansion in heterogeneous networks.
Figure 6:
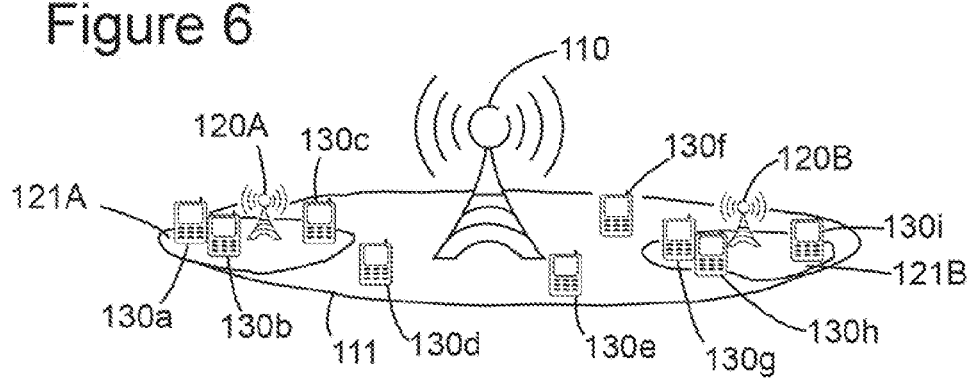
FIG. 6 is a schematic diagram illustrating a radio communication network including one or more wireless devices according to exemplary embodiments.

As illustrated in FIG. 6, wireless devices 130a-130i operate in a heterogeneous network including plural cells. A large cell 111 is served by a high power (macro) base station 110. Small cells 121A and 121B are served by the low power (e.g., pico) base stations 120A and 120B.

Figure 7:
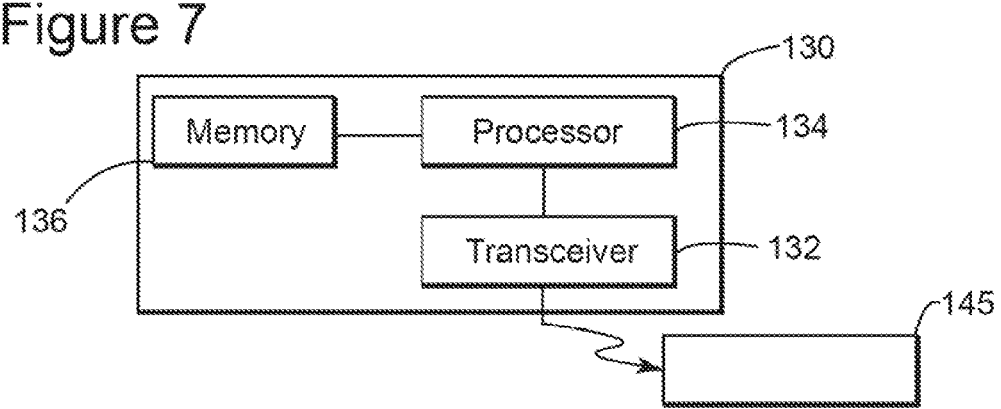
FIG. 7 is a schematic diagram of a wireless device according to an embodiment.

A wireless device 130 includes a transceiver 132 configured to send and to receive signals from more than one cell, and a processing unit 134 configured to perform measurements related to the signals, as illustrated in FIG. 7. The wireless device 130 may also include a memory 136 storing executable codes which would make the processing unit 134 and the transceiver 132 operate as described below.

The transceiver 132 is further configured to receive information defining a first pattern that is a sequence of subframes of a first type and subframes of a second type, the first pattern being related to first cells. The processing unit 134 is further configured to determine a second pattern (that is another sequence of subframes of the first type and subframes of the second type) related to second cells. The processing unit 134 determines the second pattern based on the first pattern and an indication (or pre-determined rule) relating the first pattern and the second pattern.

The indication relating the first pattern and the second pattern may be received from a configuring network node. The configuring node may be the node 145 or another node in the network. In some embodiments, the processing unit 134 may be further configured to relate the first pattern and the second pattern based on a pre-determined rule, which rule may be stored in the user equipment.

The processing unit 134 is also configured to report measurement results related to some of the signals to a network node 145. That is the processing unit 134 reports the measurement results related to signals received from a number of one or more cells. The processing unit 134 may be configured to determine the number of one or more cells based on one or more rules and depending on whether a (neighbour) cell list indicating first cells has been received. Details regarding embodiments of these rules are discussed below. The processing unit 134 may also be configured perform the measurements according to other rules as also discussed below. In the following detailed discussion, for the ease of the explanations, the text will refer to a generic UE, e.g., a wireless device such as the one illustrated in FIG. 7. Thus, when explaining that the UE performs a specific operation, this means that the processing unit 134 and the transceiver 132 are configured to be able to perform the specific operation. Although the description is given for a UE, as a measuring unit, it should be understood by the skilled in the art that "UE" is a non-limiting term which means any wireless device or node (e.g., PDA, laptop, mobile, sensor, fixed relay, mobile relay or even a radio node equipped with UE interface such as femto base station or Location Measurement Unit).

In at least some embodiments, performing measurements may also comprise cell identification, as explained below where other measurement examples are also provided. At least some of the embodiments which are described herein as employing rules may be implemented either as UE behavior or as explicit signaling (e.g., the UE sending an indication).

Although in the background section the transmit and measurement patterns have been mainly discussed in the context of eICIC, at least in some embodiments the patterns may be used for other purposes than interference coordination, e.g., energy saving, etc. Moreover, although the embodiments disclosed herein are described with a primary focus on heterogeneous networks and patterns used in such networks for interference coordination, this focus shall, however, neither be viewed as a limitation of the invention nor shall the invention be limited to the 3GPP definition of heterogeneous network deployments. For example, the methods could be adopted also for traditional macro deployments and/or networks operating more than one radio access technology (RAT).

The signaling described herein is either via direct links or logical links (e.g. via higher layer protocols and/or via one or more network nodes). For example signaling from a coordinating node may pass through another network node, e.g., a radio node. The embodiments may apply for single-frequency networks, multi-carrier (e.g., with CA) and multi-frequency networks. In this case, the disclosed signaling associated with various patterns may also be additionally associated with a particular frequency or carrier and this information may also be signaled.

A cell is associated with a radio node, where a radio node or radio network node or eNodeB are terms which are used interchangeably in the description, and which comprises in a general sense any node transmitting and receiving radio signals used for measurements, e.g., eNodeB, macro/micro/pico base station, home eNodeB, relay, or repeater. The micro eNode B is also interchangeably known as medium range eNode B. A radio node herein may comprise a radio node operating in one or more frequencies or frequency bands, and may be a radio node capable of carrier aggregation (CA). The radio node may also be a single- or multi-RAT node which may e.g. support multi-standard radio (MSR) or may operate in a mixed mode.

Multiple serving cells are possible with carrier aggregation, so "a serving cell" is in general used throughout the description for CA and non-CA systems. With CA, the primary cell is an example of a serving cell. A radio node may also be a node which does not create own cell, but still receives UL radio signals and performs UL measurements, e.g., a measurement unit such as Location Measurement Unit (LMU) or a radio node sharing the cell ID with another radio node.

The term "centralized network management node" or "coordinating node" used herein is a network node which may also be a radio network node which coordinates radio resources with one or more radio network nodes. Other examples of the coordinating node are a network monitoring and configuration node, an Operation Support System (OSS) node, an Operation and Maintenance (O&M) node, Minimization of Derive Tests (MDT) node, a Self Organizing Network (SON) node, a positioning node, a gateway node such as Packet Data Network Gateway (P-GW) or a Serving Gateway (S-GW) network node or femto gateway node, etc.

The embodiments are not limited to LTE, but may apply to any Radio Access Network (RAN), single- or multi-RAT. Some other RAT examples are LTE-Advanced, UMTS, GSM, cdma2000, WiMAX, and WiFi.

Considering first of all UE measurement behaviors when restricted measurement patterns are configured, assume a UE receives Y cells in the cell list associated with a restricted measurement pattern for performing measurements. The receiving of the cells implies receiving at least the cell identifiers of the cells to be measured. When cell identification is comprised in a measurement, the UE may then search these cells using a restricted measurement pattern, provided the detection level of the cells is within an acceptable range (e.g. down to which the requirements are applicable). In some embodiments, the patterns may be partly used for cell identification, e.g., pure cell identification may be performed without patterns, whilst the verification step may be performed with the measurement patterns. After the cell detection, the UE may continue performing measurements (e.g., RSRP and/or RSRQ) on these cells.

The following rules may be applied (independently or in any combination) by the UE, when performing measurements within a time period when the restricted measurement pattern is configured.

According to some embodiments, the UE is configured, by an external node or by an internal method, to perform and report measurements in the restricted subframes for min(Y, $Y_{min}$) cells in the list, where $Y_{min}$ is a predefined number or defined by a rule. In one example $Y_{min}=4$. In another example, $$Y_{min} = \mathrm{floor}\left(X_{basic} \cdot \frac{T_{avail}}{k \cdot T_{basic}}\right),$$

where $X_{basic}$ is the minimum number of cells to be measured if all time $k*T_{basic}$ available for measurements (i.e., $T_{avail}=k*T_{basic}$), $T_{basic}$ is the reference time (e.g. 200 ms), and $k>=1$. For example, with $X_{basic}=8$, $T_{basic}=200$ ms, k=2/10 (e.g. 2 DL subframes for TDD UL/DL configuration j), and measurement pattern 1/10 (one subframe is available for measurements), $Y_{min}=\mathrm{floor}(8*(½))=4$.

In yet another example, the available time for measurements $T_{avail}$ accounts for configured measurement gaps. For example, if the gaps are used for the concerned frequency, then the available measurement time is the time during which the measurements may be performed on this frequency in the gaps (e.g., 60 ms out of 480 ms with pattern #0 of 40 ms periodicity if the gaps are used for one frequency). In another example, when the configured measurement gaps are not used for the concerned frequency (e.g., a serving cell frequency), then the available time does not include the time during which the gaps are used for inter-frequency measurements. In yet another example, if $Y_{min}$ includes also a serving cell, then the number of neighbor cells is $Y_{min}-1$.

The neighbor cell list may, for example, include also the serving cell, even if there is a separate serving-cell pattern configured for this cell. This is to enforce the serving cell to be measured in other subframes than those designated by the specific serving cell measured pattern.

According to other embodiments, the UE is able to perform measurements and report for at least $Y_{min}$ cells if no neighbor cell list is provided in association with the restricted measurement pattern, for at least $X_{min}$ ($Y_{min}<X_{min}$) cells if such a neighbor cell list is provided. In one embodiment, $Y_{min}$ and $X_{min}$ cells may be measured in the restricted measurement subframes, e.g., the network shall provide the list if receiving more cell measurements is desired. The UE should be able to perform and report measurements for at least X cells, independently of whether a cell list is provided or not together with the restricted measurement pattern. In one embodiment, $\min(Y,Y_{min})<=X$.

The UE should be able to perform and report measurements for at least $X-\min(Y,Y_{min})$ in any subframe, which may or may not be indicated by the restricted measurement pattern. For example, assume that the UE is configured with a restricted measurement pattern and is also provided with the neighbor cell list of 3 cells i.e. at least identifiers of $Y=3$ neighbor cells to be identified and measured. The minimum requirements in terms of number of cells, which the UE is required to measure over L1 period (e.g. 200 ms in non-DRX) is 8 (i.e. $X=8$, including serving cell). Then according to the pre-defined rule the UE also identifies and performs measurements (e.g. RSRP/RSRQ) on the remaining 4 neighbor cells (after they are identified) in any subframe.

In one embodiment, according to another rule for the remaining cells (i.e. not included in the cell list), the UE may meet the requirements corresponding to unrestricted measurements. Conventionally, the UE would only measure $X=3$ neighbor cells, or alternatively the UE may measure all cells (i.e. 7 neighbor cells), using the restricted pattern. However, this is problematic since performance is degraded for all cells. The requirements for unrestricted measurements as in legacy systems are less stringent (or at least different). For example the measurement period is typically shorter for unrestricted measurements, at least in DRX.

According to some other embodiments, when the UE is configured with a restricted measurement pattern, the UE is able to perform and report measurements for at least Z cells in unrestricted subframes (not indicated by the measurement pattern). In one embodiment, $Z+\min(Y,Y_{min})=X$. In another example, $Z+\min(Y,Y_{min})>=X$, e.g., some cells may be measured in unrestricted and restricted measurement subframes. For example, cells that may be measured in unrestricted subframes may be macro cells in a macro-pico interference scenario or CSG femto cells in a macro-femto interference scenario.

According to yet other embodiments, when a UE receives at least two cell lists containing at least one cell in both lists, where the first list may be a general-purpose or mobility cell list, and the second list may be the list associated with a restricted measurement pattern, the UE performs measurements for these cells (e.g., the common cells in both lists) in unrestricted and restricted subframes and reports them separately.

The rules described thus far may apply per one or a group of frequencies or CCs, RATs, etc. For example, X may be the total number of cells over a group of frequencies.

The same rules may apply for a non-DRX state and at least some DRX states.

The rules may also apply when the UE performs other measurements in parallel (partly or fully) with the restricted measurements, where the restricted measurements may e.g. be for mobility. Examples of other measurements are acquisition of system timing information (e.g., SFN), system acquisition of the target cell such as CGI, CSG indicator etc. The term "parallel" in this context means that the measurement periods over which the different types of measurements are done overlapping at least partly.

Considering next measurement reporting when restricted measurement patterns are configured, the following rules and the corresponding signaling means may be applied (independently or in any combination) by the UE, when reporting measurements within a time period when the restricted measurement pattern is configured.

In one embodiment, the UE is able to report cells not included in the list (in a special case the list may be not configured at all together with the restricted measurement pattern). In another embodiment, the cells may be measured in unrestricted subframes only. In yet another embodiment, the cells may be measured in restricted subframes only. In another embodiment, the cells may be measured in restricted and unrestricted subframes and either separate or comparative measurements may be reported for such cells.

For cells listed for configured restricted measurements, the UE may perform measurements in unrestricted subframes. In one embodiment, the network node may request the UE to perform measurements separately also in unrestricted subframes, e.g., an indicator may be included in the restricted measurement configuration. When reporting, the UE may indicate to the receiving node in which subframes the cell measurements have been performed, e.g., restricted, unrestricted, or both, without differentiating among restricted and unrestricted subframes.

The UE may also use an aggregate indicator indicating, e.g., (A) not all reported cells are measured in restricted subframes, or (B) at least N ($N>=1$) reported cells are measured in restricted subframes.

The UE may also report the information about the signal quality levels in unrestricted and restricted subframes. Examples of signal quality levels are SCH Es/Iot (i.e. SCH SINR), RSRP, SCH received level, etc. The UE may report the signal levels especially when the same cell is measured separately in restricted or unrestricted subframes or in both restricted and unrestricted subframes. The reported information can also be expressed as the difference between the signal qualities in dB scale in the two sets of subframes.

When unable to perform measurements for at least some cells in restricted subframes, the UE may report an error message or any indication which reveals that one or more cells in the cell lists could not be measured. The UE may report the error proactively or when explicitly requested by the network node. The UE may also report the reason for the error, e.g., signal quality is below a threshold, the cells don't exist (e.g., not identified), more than the required or allowed number of measurements are requested by the network node (e.g. the number of event-triggered measurements and reporting criteria, a.k.a. parallel configured measurements, exceed a certain number which may be pre-defined e.g. by the standard or pre-configured by the implementation).

The rules above related to measurement reporting when restricted measurement patterns are configured may also apply for a certain condition, e.g., signal strength level. For example, if the signal strength level of a cell in unrestricted subframe is above a threshold, then the UE should be able to identify and report this cell. Moreover, these embodiments may be used also when defining reporting criteria, e.g., the minimum number of cells that can be measured in parallel and the measurements that can be measured in parallel.

A comparative measurement, which is an embodiment of the invention, is a measurement which indicates that one measurement is the amount Δ better or worse than the other, reference, measurement. The Δ value may be an absolute or a relative measure.

The comparative measurement and the reference measurement may be related to the same or different cells. When related to the same cell, the measurements may be performed under different conditions or on different time-frequency resources (e.g., in restricted and unrestricted subframes).

When reported for the same cell, the differences from conventional CSI reporting for which the UE may report measurements for restricted and unrestricted subframes include, for example:

the embodiments herein apply for neighbor cells, i.e. other than PCell (with CA) or serving cell (with no CA),
the embodiments herein cover other measurements, and/or
the comparative measurement, reported according to at least some embodiments, is one measurement, whilst for CSI both measurements, in absolute values, are reported.

Considering, as the next set of embodiments, signaling enhancements and pre-defined rules for pattern configuration and measurement reporting involving multiple carriers and beginning with measurement patterns, explicit signaling of multiple patterns implies signaling overhead, which may be reduced by using at least one of the pre-defined rules or an indication from the network node as described below.

In some embodiments, the UE assumes, based either on a pre-defined rule, or the serving network node indicates to the UE, that the pattern characteristics are the same or different for different carrier frequencies (i.e. intra-frequency and inter-frequency carriers). If an indication is sent to the UE by the network, the indication in its simplest form can be expressed in terms of 1 bit of information. The indication may also contain additional information such as the carriers on which the cells are to be measured assuming the patterns with same characteristics. The pattern characteristic may be any one or more of pattern sequence, pattern blanking rate (e.g., 1 out of 10 of subframes are indicated for measurements), reference time when pattern starts (e.g., SFN=0), same periodicity, etc.

In one embodiment, the same pattern characteristics may be assumed for all cells on all or at least subset of the configured CCs in CA. For example PCC and SCC in the same band have the same pattern characteristics.

In some other embodiments, the UE assumes, based on either a pre-defined rule or based on the serving network node's indication to the UE, that the patterns apply only for cells configured with CA, which may be viewed as providing the cell list associated with a pattern without explicit signaling of the cell list (given that the list is known to the configuring node and UE).

In some embodiments, the UE assumes, based on either a pre-defined rule, or the serving network node indicates to the UE, that the same pattern characteristics may be assumed for a specific measurement or all measurements.

At least some of the pattern characteristics are the same for all cells on all carriers or all or subset of the CCs in CA. For example the blanking rate (e.g. ⅛ subframe) or the pattern sequence is common on all carriers or CCs but the reference time may be different.

In embodiments applicable in a CA system, for measurements on PCC for cells that are not PCell: the pattern characteristics may be assumed or indicated as the same or different from PCell. For measurements on SCC for an SCell, some embodiments assume or receive an indication that the pattern characteristics are the same or different from PCell. In CA, having the same measurement patterns on multiple cells may increase the buffer size, but on the other hand this allows for more time for "sleep" mode.

In embodiments applicable in a CA system, for measurements on SCC for cells that are not SCells, the pattern characteristics may be assumed or indicated as:
same or different from SCell on the same CC, or
same or different from PCell on PCC,
same or different from a non-PCell on PCC.

The above mentioned rules and associated signaling or indications are applicable for patterns used in the downlink or uplink or in both directions. The rules or associated signaling are applicable independently or jointly on uplink and downlink patterns. For example the pattern characteristics may be common on all CCs in DL but different on the CCs in the UL in CA system. In another example the pattern characteristics can be assumed to be the same in DL CCs and as well as in UL CCs.

Considering now transmit patterns in this context, the same rules as described for restricted measurement patterns, may also apply for transmit patterns. Further, instead of signaling transmit pattern for a cell, there may be an indicator indicating whether the transmit pattern is the same or a superset of the restricted measurement pattern. Furthermore, when multiple cells are included in the list associated with restricted measurement pattern, there may be an aggregate indicator indicating e.g. whether for all cells in the list the transmit pattern is the same or a superset of the restricted measurement pattern. As explained earlier, transmit patterns may be signaled to another network node (e.g. to a radio node via X2) or to the UE [2] (e.g., via RRC).

Considering next restricted measurement configuration for the IDLE state, when a UE in IDLE mode is configured with a restricted measurement pattern, the UE measurement behaviors described above for restricted measurement patterns being configured may also apply here. Further, reporting rules described above for when restricted measurement patterns are configured may also be adapted as logging rules for the UE in IDLE state or in any other low activity state e.g. dormant state. The logged measurements may be reported periodically or upon a trigger or a request. The reporting can be done when the UE goes to the connected state or to any state in which the UE can report the measurement results to the network node. These rules may be particularly useful e.g. for MDT and SON. The UE can log on these measurements for the purpose of MDT, SON etc and report them to the relevant network node (e.g. serving node) when goes into connected state.

It may further be defined that Ymin_IDLE<Ymin. If broadcasted, the cell list for UEs in IDLE state may be longer than for UEs in CONNECTED state, since the cell lists for the CONNECTED state may be more accurate and signaled via dedicated signaling.

In the preceding embodiments the terms, 'measurement' and 'measurement requirement' are used. The following remarks elaborate on the meaning of these terms.

The measurements are typically performed on specific channels or physical signals such as synchronization signals, cell-specific reference signals, positioning reference signals, dedicated reference signals, etc.

The measurements may refer to any type of UE measurements used for mobility or general RRM; examples are cell identification or PCI identification, cell global ID identification, cell global ID (CGI) or evolved CGI (ECGI) identification, RSRP, RSRQ etc. Yet another example is that of radio link monitoring done to monitor the quality if the serving cell. In CA the RLM is done at least on the PCell but it may also be performed over one or more SCells.

The measurements may refer to timing measurements in general, e.g., one-way propagation delay, RTT, timing advance, UE Rx-Tx, etc.

The measurements may also refer to positioning-related measurements or measurements performed for positioning purposes such as positioning timing measurements (e.g. RSTD, time of arrival, UE Rx-Tx time difference, timing advance, measurements), signal measurements (e.g., signal power or signal strength), angle of arrival, cell identification reported for positioning purpose, etc. For UE-assisted or network-based positioning, positioning measurements are typically requested by positioning node (e.g., E-SMLC in LTE) and performed by the UE or radio node and then reported to the positioning node via LPP, LPPa, LPPe or similar protocol. For UE-based positioning, the measurements are performed by the UE and may be configured either autonomously by the UE or by another node (e.g., eNodeB).

The measurements may also refer to those performed for specific purposes like minimization of drive tests (e.g., coverage, paging channel quality or failure rate, broadcast channel quality or failure rate etc) or for SON, etc. See the discussion below for more details.

The above measurements can be performed on intra-frequency frequency, inter-frequency (intra-band or inter-band) or inter-RAT (e.g. E-UTRA TDD or FDD) or inter-RAT E-UTRA cell measured from other RATs (e.g. when serving cell is UTRA, GSM, CDMA2000 or HRPD etc).

Further, the embodiments herein may apply, but are not limited, to
single-frequency/carrier or multi-frequency/carrier networks,
networks with or without CA,
CoMP,
networks where measurements may be performed over multifarious links, e.g., as described in U.S. Provisional Patent Application 61/496,327 on 2011-06-13, where the DL and UL links may or may not be co-located, the disclosure of which is incorporated here by reference,
Distributed Antenna System (DAS) and deployments with RRU, etc.

A "neighbour cell" may be the cell on the same or different frequency or component carrier, it may have the same or different DL and UL coverage and/or transmitters/receivers, and it may be a DL-only or an UL-only cell.

The measurements may also refer to measurements performed over one or multiple radio links (e.g., with CoMP, DAS, multifarious links, etc.). Multiple links may comprise e.g. multiple links in DL (e.g., DL CoMP), multiple links in UL (e.g., UL CoMP), or at least one link in DL and at least one link in UL (e.g., as for UE Rx-TX measurements, RTT, etc.). The multiple links may be on the same or a different frequency/carrier, may be for the same or different RATs, etc.

Furthermore, in case of multiple links, one or more links can be activated and deactivated by the base station (e.g. eNode B in LTE). The deactivation may e.g. be done by the eNB using lower layer signaling (e.g. over PDCCH in LTE) using a short command such as ON/OFF (e.g. using 1 bit for each link). The activation/deactivation command is sent to the UE via the primary link. Typically the deactivation is done when there is no data to transmit on the secondary link(s) which is one issue for timing measurements which may be not based on data transmissions. The activation/deactivation may be done independently on uplink and downlink secondary links, which creates another issue for two-directional timing measurements, e.g., Rx-Tx measurements. The purpose of the deactivation is thus to enable UE battery saving. The deactivated secondary links can be activated also by the same lower layer signaling.

The measurements may also refer to those performed by the UE for assisting functions such as scheduling, link adaptation etc. Examples of such measurements are channel state information (CSI) measurements or more specifically CQI, rank indicator, recommended layers for multi-antenna transmission etc.

The measurements may also refer to those performed by the UE for the maintenance of serving cell quality or link performance. Examples of such measurements out of sync detection, in sync detection, radio link monitoring, channel estimation measurements, etc.

The measurements may also refer to those performed by the BS on the signals transmitted by the UE or by other nodes for various purposes such as for uplink interference measure, load estimation, propagation delay, mobility, positioning (e.g. BS RX-TX time difference measurement, angle of arrival of signal, timing advanced etc).

The measurements may also refer to those performed on UL and/or DL signals by a radio node in general, including radio measurement units (e.g., LMU or the associated physical node with a logical LMU entity), etc.

The measurements above may be performed by UE or radio node, and may be configured by radio node (e.g., serving eNodeB) or other network node (positioning node, MDT node, SON node, etc). The measurements may also be received by some nodes and forwarded to other nodes, transparently or not. For example, positioning measurements reported to positioning node are transmitted transparently via serving eNodeB. In another example, one radio node may forward the information to another radio node, e.g., via X2 at handover or by a relay. In yet another example, eNodeB may forward radio measurements to MDT or SON node. In yet another example, a UE may forward other UE's or radio node's measurements. Measurement rules described herein may thus apply to any of the measurement reporting ways which are available, e.g., via direct links, via logical links, by forwarding, etc.

The minimization of drive test (MDT) feature has been introduced in LTE and HSPA Rel-10. The MDT feature provides means for reducing the effort for operators when gathering information for the purpose of network planning and optimization. The MDT feature requires that the UEs log or obtain various types of measurements, events and coverage related information. The logged or collected measurements or relevant information are then sent to the network. This is in contrast to the traditional approach where the operator has to collect similar information by means of the so called drive tests and manual logging.

The UE can collect the measurements during connected as well as in low activity states e.g. idle state in UTRA/E-UTRA, cell PCH states in UTRA etc. A few examples of potential MDT UE measurements are:

Coverage or mobility measurements e.g. RSRP, RSRQ etc.
Random access failure
Paging Channel Failure (PCCH Decode Error)
Broadcast Channel failure
Radio link failure report The E-UTRAN employs the concept of self organizing network (SON). The objective of the SON entity is to allow operators to automatically plan and tune the network parameters and configure the network nodes.

The conventional method is based on manual tuning, which consumes enormous amount of time and resources, and requires considerable involvement of the work force. In particular due to the network complexity, large number of system parameters, IRAT technologies etc. it is very attractive to have reliable schemes and mechanisms which could automatically configure the network whenever necessary. This can be realized by SON, which can be visualized as a set of algorithms and protocols performing the task of automatic network tuning, planning, configuration, parameter settings etc. In order to accomplish this, the SON node requires measurement reports and results from other nodes e.g. UE, base station etc.

The measurement requirements may refer to aspects including, but not limited to, measurement accuracy of the measurement quantities (e.g. RSRP accuracy), measurement period, time to identify a cell (e.g. PCI or CGI detection delay), out of sync or in sync detection delay, CSI quality or CSI reporting time etc.

Next, the discussion turns to describe methods in a network apparatus (e.g. serving eNode B or other node such as positioning node, O&M, SON, MDT) of configuring transmit patterns in a radio node, configuring pattern characteristics at the UE, receiving measurement results from the UE and forwarding configuration information/measurement results to other network nodes. The network node methods described below may be performed in accordance with any of the other embodiments described herein.

Figure 8:
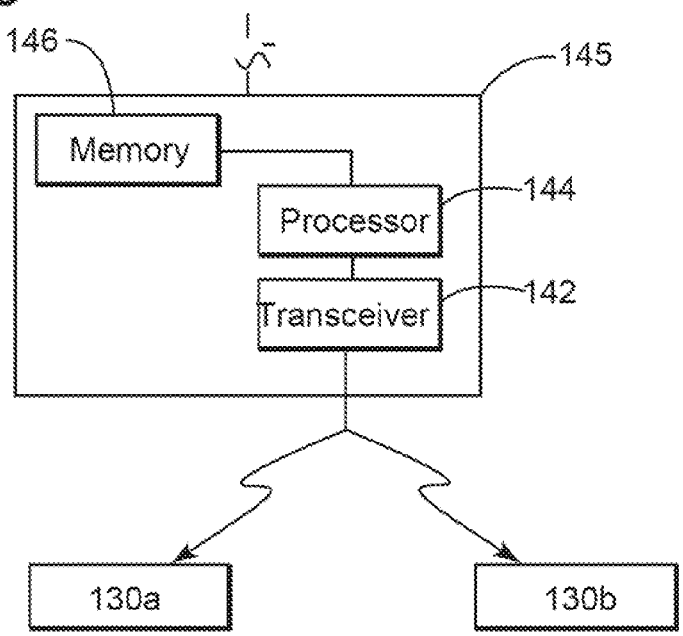
FIG. 8 is a schematic diagram of a network apparatus according to an exemplary embodiment.

According to an exemplary embodiment, as illustrated in FIG. 8, a network apparatus 145 for communicating with wireless devices such as 130a, 130b in, e.g., a heterogeneous network, includes a transceiver 142 and a processing unit 144. The transceiver 142 is configured to enable communication with the wireless devices. The network apparatus 145 may also include a memory 146 configured to store executable codes which would make the processing unit 144 and the transceiver 142 operate as described below.

The processing unit 144 is configured to receive (from a wireless devices, via the transceiver 142) measurement results corresponding to measurements of signals received by the wireless device from more than one cell. The processing unit 144 is further configured to interpret the measurements results taking into account that the wireless device performs the measurements on signals received from or sent to more than one cell, depending on a first pattern and on a second pattern. The first pattern is a sequence of subframes of a first type and subframes of a second type, the first pattern being related to first cells and being provided to the wireless device. The second pattern is another sequence of subframes of the first type and subframes of the second type, the second pattern being related to second cells and being determined by the wireless device based on the first pattern and an indication relating the first pattern and the second pattern. The processing unit 144 also takes into account that the wireless device reports the measurement results for a number of one or more cells. In the following detailed discussion, for the ease of the explanations, the text will refer to a generic network node, by this term understanding a network apparatus such as the one illustrated in FIG. 8.

For example, a UE performing one or more measurements according to the rules described above with respect to UE behaviors when restricted measurement patterns are configured, reports the measurement results to the network node e.g. a serving radio network node such as an eNode B.

The network node may likewise be configured to transmit the first pattern and/or an indication relating the first pattern and the second pattern in accordance with the embodiments discussed above. Alternatively, the network node may transmit the first pattern and the UE can determine the second pattern based on a pre-determined rule, as described above.

The network node receiving the measurement results can process or interpret the results on the measurements done according to the rules defined above. For example the network node should be able to identify the difference between the measurements done by the UE over restricted and unrestricted resources (e.g. subframes). This is done by comparing the pre-defined requirements for the two cases: restricted and unrestricted measurements.

The network node may also be able to send an indication to the UE or configure the UE with the information regarding the pattern characteristics on different carriers (in single carrier or multi-carrier operation) as described above. The network node may also receive and/or send the indication or any information pertaining to the pattern characteristics on different carriers to other network nodes. For example the eNode B (eNB-A) can indicate to the neighboring eNode Bs that the pattern characteristics for performing measurements on all carriers or on subset of carriers used in eNB-A are the same or different. The indication may be separate or common for DL carriers or UL carriers. The indication may also be specific to certain types of carriers. The indication can also be exchanged between the network nodes in transparent container e.g. over X2. In this the receiving node (e.g. serving eNB) forwards the indication about the target node (e.g. target eNode B) to the UE during or prior to a cell change such as PCell change, PCC change, handover RRC connection re-establishment etc, The indication is sent to the UE typically using RRC in a cell change message e.g. handover command, RRC reconfiguration etc.

The network node may also forward the information associated with the patterns on different carriers and also the measurement results received from a measuring node (e.g. UE, eNode, LMU, relay node, donor eNode B, etc) based on the principles and rules described in the preceding sections to network nodes which perform tasks related to at least one of the network management, network monitoring, network planning, network configuration, parameter setting, parameter tuning etc. Examples of such nodes are: O&M, OSS, SON, MDT etc. These nodes receive the configuration information and/or results, interpret them and use them for network planning and configuration. For example these nodes may estimate and recommend optimal number of certain base station types (e.g. pico BSs) in an area or cell bandwidths, etc. for optimizing the network.

Considering now the applicability of the foregoing embodiments to test cases and test equipment, the methods and rules described herein, e.g., the method of measurement configuration in UE (or any wireless device e.g. mobile relay, radio measurement unit, etc.) or measurement patterns and/or transmit patterns which may also be communicated to a measuring node if configured by another node, can also be configured in the test equipment (TE) node (also known as a system simulator (SS)).

Figure 9:
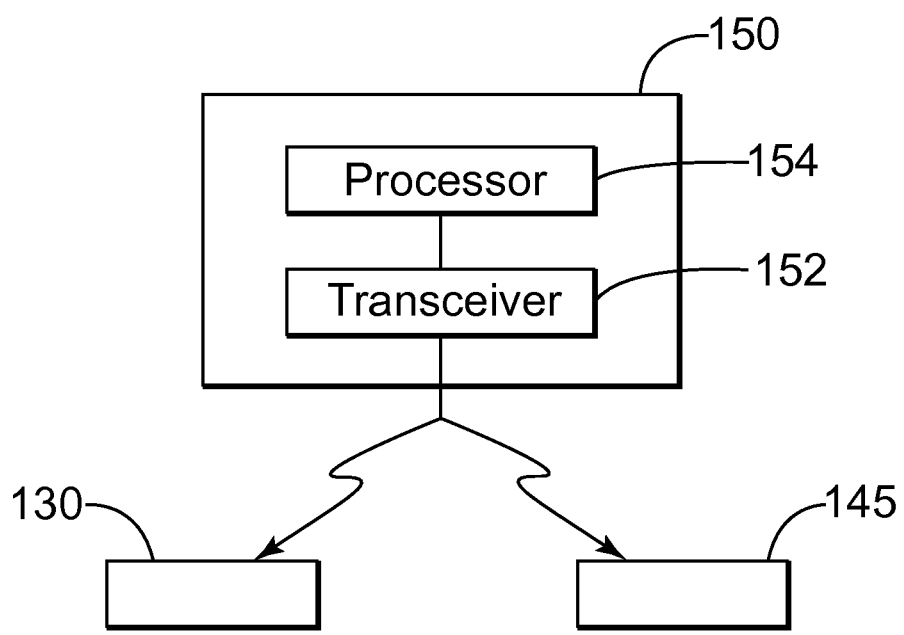
FIG. 9 is a schematic diagram of a test equipment according to an exemplary embodiment.

According to an exemplary embodiment illustrated in FIG. 9, a TE node 150 includes a processing unit 154 and a transceiver 152. The processing unit 154 is configured to test at least one of a wireless device as set forth above according to one embodiment and a network apparatus as set forth above. The transceiver 152 is configured to enable a radio communication of the processing unit with the wireless device or the network apparatus that are tested. The TE node 150 may also include a memory (not shown) storing executable codes which would make the processing unit 154 and the transceiver 152 to operate as described below.

The TE node (or SS) is configured to verify one or more UE or network node requirements, procedures, signaling, protocol etc. The TE node implements configuration methods related to measurement pattern configuration in order to be able to configure the UE for the test. The purpose of the test is to verify that the UE is compliant to the pre-defined rules, protocols, signaling and requirements associated with measurement patterns described in the embodiments above. Such tests may be conducted for intra-frequency, inter-frequency and inter-RAT measurements under the conditions for which the rules are specified. The tests may also be conducted for measurements on PCC and SCC in CA. The test may also be conducted for UE in an IDLE state or another low-activity mode. The TE or SS in the test system will also be capable of at least one of:

configuring the transmitting node with the necessary transmit pattern information as described in the embodiments of this disclosure;

configuring the UE under tests with the necessary information associated with the pattern characteristics described in the embodiments of this disclosure;

receiving the UE measurement results associated with the restricted measurement pattern based on the pre-defined rules or configuration done by the TE or SS;

analyzing the received results e.g. comparing the with the reference results. The reference can be based on the pre-defined rules, requirements or UE behavior.

The tests can also be done in a real network also known as field trials. In that case the testing procedures are implemented in the network node e.g. eNode B, relay, donor node, positioning node, MDT node, SON node etc. In this case the relevant network node (e.g. eNode B) is required to implement the test procedures to verify one or more aspects of the restricted measurements performed by the UE, The network node may also be configured in a special test mode to verify one or more aspects of the restricted measurements performed by the UE. The network node is therefore required to implement such a test mode and should be configurable either manually or by receiving a signal from another node (e.g. operator controlled O&M node).

A flow diagram of a method according to an embodiment performed in a wireless device of a radio-communication system is illustrated in FIG. 10. Therein, at step 1100, a UE receives radio signals on at least a first carrier frequency. The radio signal includes information regarding a first pattern associated with the first carrier frequency. The first pattern is a sequence of subframes of a first type and subframes of a second type. In step 1102, the UE determines a second pattern, the determination being based on the first pattern and at least one of an indication and a pre-determined rule, which indication or pre-determined rule relates the first pattern to the second pattern. As indicated in step 1104, the first pattern and the second pattern are at least one of a measurement pattern and a transmit pattern. In this context, a transmit pattern may interchangeably be referred to as a signal transmit pattern or a signal transmission pattern. A signal may be a physical signal or a physical channel or a combination thereof and can be transmitted over one or more time-frequency resources. May apply to one or more signals.

The foregoing embodiments may provide one or more of the following benefits or advantages which include, but are not limited to:

methods in a network node to configure UEs with measurements following the described rules;

non-ambiguous UE measurements and reporting when measurement patterns are used;

reduced signaling overhead when configuring multiple patterns;

reduced signaling for restricted measurements done in CA and multi-carrier (e.g. inter-frequency);

UE behavior is defined to enable interpretation of results; and/or methods to verify restricted measurements using test system or in real field.

The above-described example embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A wireless device comprising:
a transceiver configured at least to receive radio signals on at least a first carrier frequency, wherein said transceiver is further configured to receive information regarding a first pattern associated with the first carrier frequency, the first pattern being a sequence of subframes of a first type and subframes of a second type; and
a processor configured to determine a second pattern, the determination being based on the first pattern and at least one of an indication and a pre-determined rule, which indication or pre-determined rule relates the first pattern to the second pattern,
wherein
the first pattern and the second pattern are at least one of a measurement pattern and a transmit pattern,
the processor is further configured
to determine a number of one or more cells for which the measurements are performed in the second type of subframes, according to at least one of the following rules:
the number of one or more cells is larger or equal to a minimum number of cells, independent of whether a neighbor cell list has been received; and
the number of one or more cells is smaller or equal to a maximum number, independent of whether the neighbour cell list has been received and
to report the measurement results for the determined one or more cells.

2. The wireless device of claim 1, wherein the first pattern and the second pattern are measurement patterns, and wherein the first type of subframes is restricted subframes and the second type of subframes is unrestricted subframes, the restricted subframes providing a lower interference measurement opportunity for the wireless device relative to the unrestricted subframes.

3. The wireless device of claim 1, wherein the first pattern and the second pattern are transmit patterns, and wherein the first type of subframes contain restricted signal transmission and the second type of subframes contain unrestricted signal transmission, wherein the restricted signal transmission refers to either not transmitting any signal, transmitting a limited subset of signals or transmitting at a lower power.

4. The wireless device of claim 3, wherein the transmit pattern is an ABS pattern.

5. The wireless device of claim 1, wherein
the indication which relates the first pattern to the second pattern is received from a configuring network node, or
the processor is further configured to determine the second pattern based on the pre-determined rule and the first pattern.

6. The wireless device of claim 1, wherein
(A) the indication which relates the first pattern to the second pattern indicates that the first pattern and the second pattern are identical or that the first pattern and the second pattern are different, or
(B) the indication which relates the first pattern to the second pattern indicates that the first pattern and the second pattern are identical for a predetermined type of measurement, or
(C) the indication which relates the first pattern to the second pattern indicates that the first pattern and the second pattern have a same one or more characteristics.

7. The wireless device of claim 6, wherein, if the indication relating the first pattern and the second pattern indicates that the first pattern and the second pattern have the same one or more characteristics, the same one or more characteristics includes at least one of: a reference starting time, a subsequence of the subframes of the first type and the subframes of the second type, number of subframes of the first type and subframes of the second type, and/or a periodicity.

8. The wireless device of claim 1, wherein the first carrier frequency is a serving carrier frequency and further comprising a second carrier frequency which is an inter-frequency carrier frequency.

9. A wireless device comprising:
a transceiver configured at least to receive radio signals on at least a first carrier frequency, wherein said transceiver is further configured to receive information regarding a first pattern associated with the first carrier frequency, the first pattern being a sequence of subframes of a first type and subframes of a second type; and
a processor configured to determine a second pattern, the determination being based on the first pattern and at least one of an indication and a pre-determined rule, which indication or pre-determined rule relates the first pattern to the second pattern,
wherein
the first pattern and the second pattern are at least one of a measurement pattern and a transmit pattern, wherein
the first carrier frequency is a primary component carrier and further comprising a second carrier frequency which is a secondary component carrier in a multi-carrier system, a coordinated multipoint system or in a distributed antenna system,
if a neighbour cell list has been received by the wireless device and the neighbour cell list indicates a first number of cells, a second number of cells indicated in the cell list are measured in the subframes of the second type according to the first pattern, and
the first and the second number of cells are determined based on a minimum number of cells that may be measured in parallel.

10. The wireless device of claim 8, wherein the processor is configured to perform measurements on the first carrier and on the second carrier using the first pattern and the second pattern, respectively.

11. The wireless device of claim 9, wherein the second number of cells is measured in the subframes of the first type and the second type according to the first pattern.

12. The wireless device of claim 9, wherein the first and the second number of cells are also determined based on at least one of: interference conditions in at least one of the first and second type of subframes, received signal strength or received signal quality in at least one of the first and the second type of subframes.

13. The wireless device of claim 1, wherein, if the neighbor cell list has not been received, the number of one or more cells is larger than if the cell list has been received.

14. The wireless device of claim 1, wherein the processor is configured to perform measurements according to at least one of the following rules:
a minimum number of cells are measured in each subframe; and
a predetermined number of cells are measured in each subframe of the second type.

15. The wireless device of claim 1, the transceiver is further configured to transmit a measurement report including information reflecting at least one of:
(A) that the measurements have been performed in the subframes of the first type according to the first pattern,
(B) that the measurements have been performed in the subframes of the second type according to the first pattern,
(C) that the measurements have been performed both in the subframes of the first type and in the subframes of the second type according to the first pattern,
(D) that not all the measurements have been performed in the subframes of the first type, or
(E) that a minimum number of measurements have been performed in the subframes of the first type.

16. The wireless device of claim 1, wherein the transceiver is further configured to transmit a measurement report including information about signal quality in the subframes of the first type and in the subframes of the second type according to the first pattern.

17. The wireless device of claim 1, wherein measurements are one or more of mobility measurements, measurements for radio resource management, measurements for radio link monitoring, or measurements for channel state information, timing measurements, positioning measurements, measurement for minimization of drive tests, measurements for self organizing networks, or measurements performed in CONNECTED state.

18. The wireless device of claim 1, wherein the wireless device is a user equipment, a relay, a repeater or a measuring node.

19. A method, performed by a wireless device, for processing radio signals associated with wireless communications, the method comprising:
receiving radio signals on at least a first carrier frequency, said radio signals including information regarding a first pattern associated with the first carrier frequency, the first pattern being a sequence of subframes of a first type and subframes of a second type;
determining a second pattern, the determination being based on the first pattern and at least one of an indication and a pre-determined rule, which indication or pre-determined rule relates the first pattern to the second pattern;
determining a number of one or more cells for which the measurements are performed in the second type of subframes, according to at least one of the following rules:
the number of one or more cells is larger or equal to a minimum number of cells, independent of whether a neighbour cell list has been received; and the number of one or more cells is smaller or equal to a maximum number, independent of whether the neighbour cell list has been received and reporting the measurement results for the determined one or more cells, wherein the first pattern and the second pattern are at least one of a measurement pattern and a transmit pattern.

20. The method of claim 19, wherein the first pattern and the second pattern are measurement patterns, and wherein the first type of subframes is restricted subframes and the second type of subframes is unrestricted subframes, the restricted subframes providing a lower interference measurement opportunity for the wireless device relative to the unrestricted subframes.

21. The method of claim 19, wherein the first pattern and the second pattern are transmit patterns, and wherein the first type of subframes contain restricted signal transmission and the second type of subframes contain unrestricted signal transmission, wherein the restricted signal transmission refers to either not transmitting any signal, transmitting a limited subset of signals or transmitting at low power.

22. The method of claim 21, wherein the transmit pattern is an ABS pattern.

23. The method of claim 19, further comprising either:

receiving the indication which relates the first pattern to the second pattern from a configuring network node, or determining, by the wireless device, the second pattern based on the pre-determined rule and the first pattern.

24. The method of claim 19, wherein (A) the indication which relates the first pattern to the second pattern indicates that the first pattern and the second pattern are identical or that the first pattern and the second pattern are different, or (B) the indication which relates the first pattern to the second pattern indicates that the first pattern and the second pattern are identical for a predetermined type of measurement, or (C) the indication which relates the first pattern to the second pattern indicates that the first pattern and the second pattern have a same one or more characteristics.

25. The method of claim 24, wherein, if the indication relating the first pattern and the second pattern indicates that the first pattern and the second pattern have the same one or more characteristics, the same one or more characteristics includes at least one of: a reference starting time, a subsequence of the subframes of the first type and the subframes of the second type, number of subframes of the first type and subframes of the second type, and/or a periodicity.

26. A method, performed by a wireless device, for processing radio signals associated with wireless communications, the method comprising:

receiving radio signals on at least a first carrier frequency, said radio signals including information regarding a first pattern associated with the first carrier frequency, the first pattern being a sequence of subframes of a first type and subframes of a second type; and determining a second pattern, the determination being based on the first pattern and at least one of an indication and a pre-determined rule, which indication or pre-determined rule relates the first pattern to the second pattern, wherein the first carrier frequency is a primary component carrier and further comprising a second carrier frequency which is a secondary component carrier in a multi-carrier system, a coordinated multipoint system or in a distributed antenna system, if a neighbour cell list has been received by the wireless device and the neighbour cell list indicates a first number of cells, a second number of cells indicated in the cell list are measured in the subframes of the second type according to the first pattern, and the first and the second number of cells are determined based on at least one of: interference conditions in at least one of the first and second type of subframes, received signal strength or received signal quality in at least one of the first and the second type of subframes.

* * * * *